United States Patent
Yagisawa

(10) Patent No.: US 9,191,208 B2
(45) Date of Patent: Nov. 17, 2015

(54) SCHEMES FOR SIGNCRYPTION

(71) Applicant: Empire Technology Development LLC, Wilmington, DE (US)

(72) Inventor: Masahiro Yagisawa, Yokohama (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/995,312

(22) PCT Filed: Dec. 18, 2012

(86) PCT No.: PCT/US2012/070369
§ 371 (c)(1),
(2) Date: Jun. 18, 2013

(87) PCT Pub. No.: WO2014/098807
PCT Pub. Date: Jun. 26, 2014

(65) Prior Publication Data
US 2014/0169556 A1    Jun. 19, 2014

(51) Int. Cl.
*H04L 29/06* (2006.01)
*H04L 9/30* (2006.01)
(Continued)

(52) U.S. Cl.
CPC .............. *H04L 9/3066* (2013.01); *H04L 9/083* (2013.01); *H04L 9/0816* (2013.01); *H04L 9/0825* (2013.01); *H04L 9/0861* (2013.01); *H04L 9/3247* (2013.01); *H04L 2209/72* (2013.01)

(58) Field of Classification Search
CPC ..... H04L 9/0816; H04L 9/0825; H04L 9/083; H04L 9/0861; H04L 9/3066; H04L 9/3247; H04L 2209/72
USPC .................................................. 713/171, 176
See application file for complete search history.

(56) References Cited

U.S. PATENT DOCUMENTS 5,701,464 A * 12/1997 Aucsmith .............................. 1/1
2004/0205337 A1   10/2004 Mao et al.
(Continued)

OTHER PUBLICATIONS

Yagisawa, Masahiro, "Key Agreement Protocols Using Multivariate Equations on Non-commutative Ring", 2010, pp. 1-6.*
(Continued)

*Primary Examiner* — Jeffrey D Popham
(74) *Attorney, Agent, or Firm* — Brundidge & Stanger, P.C.

(57) ABSTRACT

Technologies are generally described for providing a signcryption scheme. In some examples, a method performed under control of a sender device may include calculating a public key of the sender device based on a system parameter, calculating a temporary public key of the sender device based on the system parameter, calculating a temporary common key of the sender device based on a temporary secret key of the sender device and a public key of a receiver device, calculating a ciphertext from a message based on the temporary common key and generating a signature of the sender device based on an intermediate parameter, the system parameter and the secret key of the sender device. The temporary secret key of the sender device, intermediate parameter and secret key of the sender device are engaged in a non-associative octonion ring.

In some examples, a method performed under control of a receiver device may include calculating a public key of the receiver device based on a system parameter, calculating a temporary common key of the receiver device based on a temporary public key of the sender device and a secret key of a receiver device, deciphering the ciphertext based on the temporary common keys of receiver device, determining whether the digital signature received is generated by sender device. A temporary public key of the sender device, the secret key of the receiver device and the temporary common keys of the receiver device are engaged in a non-associative octonion ring.

18 Claims, 7 Drawing Sheets

(51) Int. Cl.
*H04L 9/08* (2006.01)
*H04L 9/32* (2006.01)

(56) References Cited

U.S. PATENT DOCUMENTS

2006/0026426 A1  2/2006  Chen et al.
2010/0174910 A1* 7/2010  Little .......................... 713/176

OTHER PUBLICATIONS

International Search Report from International Application No. PCT/US12/070369 mailed Mar. 25, 2013.
Al-Riyami, S. S., and Paterson, K. G., "Certificateless public key cryptography," ASIACRYPT 2003, Lecture Notes in Computer Science, vol. 2894, pp. 452-473 (Dec. 2003).
Barbosa, M., and Farshim, P., "Certificateless signcryption," Proceedings of the 2008 ACM Symposium on Information, Computer and Communication Security, pp. 369-372 (Mar. 18, 2008).
Bardet, M., et al., "On the complexity of Gröbner basis computation of semi-regular overdetermined algebraic equations," Proceeding of the International Conference on Polynomial System Solving (ICPSS2004), pp. 1-4 (Nov. 2004).
Boneh, D., and M. Franklin, M., "Identity-based encryption scheme from Weil pairing," CRYPTO 2001, Lecture Notes in Computer Science, vol. 2139, pp. 213-229 (Oct. 2001).
Diffie, W., and Hellman, M.E., "New Directions in Cryptography," IEEE Transactions on Information Theory, vol. 22, No. 6 , pp. 644-654 (Nov. 1976).
Elgamal, T., "A public key Cryptosystem and a Signature Scheme Based on Discrete Logarithms", Proceeding Crypto 84, LNCS 196, Blakley, G.R., and Chaum, D., (Eds.), pp. 10-18 (Aug. 23, 1985).
Han, Y., and Yang, X., "ECGSC: Elliptic curve based generalized signcryption scheme," Cryptology ePrint Archive, Report 2006/126, pp. 1-15 (Sep. 3, 2006).
Ji, H., et al., "Certificateless generalized signcryption," Cryptology ePrint Archive, Report 2010/204, 8 pages (Apr. 2010).
Lal, S., and Kushwah, P., "ID based generalized signcryption" Cryptology ePrint Archive, Report 2008/84, pp. 1-26 (Aug. 2008).
Malekian, E. and Zakerolhosseini, A., "NTRU-Like Public Key Cryptosystems beyond Dedekind Domain up to Alternative Algebra," Gavrilova, M.L, et al. (Eds.), Trans. On Comput. Sci. X, LNCS 6340, pp. 25-41 (Jan. 1, 2010).
Malekian, E., and Zakerolhosseini, A., "A non-associative lattice-based public key Cryptosystem," Security and Communication Networks, vol. 5, No. 2, pp. 145-163 (Feb. 2, 2012) http://onlinelibrary.wiley.com/doi/10.1002/sec.297/abstract.

Malone-Lee, J., "Identity-based signcryption," Cryptology ePrint Archive Report 2002/098, 8 pages (Sep. 2002).
Matsumoto, T., and Imai, H., "Public Quadratic Polynomial-Tuples for Efficient Signature Verification and Message-Encryption," Lecture Notes in Computer Science on Advances in Cryptology-EUROCRYPT'88, vol. 330, pp. 419-453 (Apr. 1, 1988).
Mohamed, E., and Elkamchouchi, H., "Elliptic Curve Signcryption with Encrypted Message authentication and Forward Secrecy", IJCSNS International Journal of Computer Science and Network Security, vol. 9, No. 1, pp. 395-398 (Jan. 2009).
Rivest, R. L., et al., "A Method for Obtaining Digital Signatures and Public-Key Cryptosystems," Comm. of the ACM, vol. 21, No. 2, pp. 120-126 (Feb. 1978).
Shamir, A., "Identity-Based Cryptosystems and Signature Schemes," CRYPTO 84, LNCS, vol. 196, pp. 47-53 (Aug. 23, 1984).
Tsujii, S., et al., "Proposal Integrated MPKC:PPS-STS Enhanced Perturbed Piece in Hand Method," IEICE Tech. Rep. ISEC2009-27, SITE2009-19, ICSS2009-41, vol. 109, No. 115, 8 pages (Jul. 2009).
Tsujii, S., et al., "Piece in Hand Concept for Enhancing The Security of Multivariate Type Public Key Cryptosystems: Public Key Without Containing All The Information of Secret Key," IACR Eprint archive, Cryptology ePrint Archive, Report 2004/366, 32 pages (Dec. 16, 2004).
Wang, X, et al., "Provable secure generalized signcryption," Cryptology ePrint Archive, Report 2007/173, 16 pages (May 5, 2007).
Wolf, C., and Preneel, B., "Taxonomy of Public Key Schemes based on the problem of Multivariate Quadratic equations," Cryptology ePrint Archive, Report 2005/077, 64 pages (Dec. 15, 2005).
Zheng, Y., "Digital signcryption or how to achieve Cost (Signature & Encryption) << Cost (Signature)+Cost (Encryption)", Advances in Cryptology—CRYPTO'97, LNCS, vol. 1294, pp. 165-179 (May 1997).
Zheng, Y., and Imai, H., "How to construct efficient signcryption schemes on elliptic curves", Information Processing Letters, vol. 68, No. 5, pp. 227-233 (Oct. 9, 1998).
Yu, G., et al., "Provable secure identity based generalized signcryption scheme," Theoretical Computer Science, vol. 411, pp. 3614-3624 (Jun. 6, 2010).
Zheng, Y., "Signcryption and Its Applications In Efficient Public Key Solutions," ISW'97, Lecture Notes in Computer Science, Springer-Verlag, vol. 1397, pp. 291-312 (Sep. 1998).
Malekian, E. and Zakerolhosseini, A., "Ntrū-Like Public Key Cryptosystems beyond Dedekind Domain up to Alternative Algebra," Faculty of Electrical & Computer Engineering Shahid Beheshti University, Tehran, Iran, pp. 1-16 (Aug. 14, 2009).

* cited by examiner

SCHEMES FOR SIGNCRYPTION

CROSS-REFERENCE TO RELATED APPLICATION

The present application is a U.S. national stage filing under 35 U.S.C. § 371 of International Application No. PCT/US12/7369, filed on Dec. 18, 2012.

BACKGROUND

Signcryption is a public-key primitive that simultaneously performs functions of both digital signature and encryption of a message. Signcryption schemes may provide properties of both digital signatures and encryption schemes in a way that is more efficient than signing and encrypting separately. Recently, demands for both improving security and reducing computational complexity in signcryption schemes have drawn intense scrutiny.

SUMMARY

In an example, a method performed under control of a sender device may include selecting a secret key of the sender device, calculating a public key of the sender device based at least in part on a system parameter published by a central system, transmitting the public key of the sender device to the central system, selecting a temporary secret key of the sender device, calculating a temporary public key of the sender device based at least in part on the system parameter published by the central system, calculating a temporary common key of the sender device based at least in part on the temporary secret key of the sender device and a public key of a receiver device, calculating a ciphertext from a message based at least in part on the temporary common key, generating a signature of the sender device from the ciphertext based at least in part on an intermediate parameter, the system parameter and the secret key of the sender device, and transmitting the temporary public key of the sender device, ciphertext and signature to the receiver device. The temporary secret key of the sender device, intermediate parameter and secret key of the sender device are engaged in a non-associative octonion ring.

In another example, a method performed under control of a receiver device may include selecting a secret key of the receiver device, calculating a public key of the receiver device based at least in part on a system parameter published by a central system, transmitting the public key of the receiver device to central system, receiving, from a sender device, a ciphertext and a temporary public key of the sender device, calculating a temporary common key of the receiver device based at least in part on the temporary public key of the sender device, a secret key of the receiver device and the system parameter published by the central system, and obtaining a message by deciphering the ciphertext based at least in part on the temporary common key of the receiver device. The secret key of the receiver device is engaged in a non-associative octonion ring.

In yet another example, a sender device may include a key selecting unit configured to select a secret key of the sender device and a temporary secret key of the sender device, a temporary public key calculating unit configured to calculate a temporary public key of the sender device based at least in part on a system parameter published by a central system, a temporary common key calculating unit configured to calculate a temporary common key of the sender device based at least in part on the temporary secret key of the sender device and a public key of a receiver device, a ciphertext calculating unit configured to calculate a ciphertext from a message based at least in part on the temporary common key, a signature generating unit configured to generate a signature of the sender device from the ciphertext based at least in part on the system parameter, an intermediate parameter, and the secret key of the sender device, and a transmitting unit configured to transmit the temporary public key of the sender device, ciphertext and signature to the receiver device. The temporary secret key of the sender device, intermediate parameter and secret key of the sender device are engaged in a non-associative octonion ring.

In yet another example, a receiver device may include a receiving unit configured to receive, from a sender device, a ciphertext and a temporary public key of the sender device, a temporary common key calculating unit configured to calculate a temporary common key of the receiver device based at least in part on the temporary public key of the sender device, a secret key of the receiver device and a system parameter published by a central system, and a message obtaining unit configured to obtain a message by deciphering the ciphertext based at least in part on the temporary common key of the receiver device. The secret key of the receiver device is engaged in a non-associative octonion ring.

In yet another example, a computer-readable storage medium may store computer-executable instructions that, in response to execution, cause a sender device to perform operations including selecting a secret key of the sender device and a temporary secret key of the sender device, calculating a public key of the sender device based at least in part on a system parameter published by a central system, transmitting the public key of the sender device, calculating a temporary public key of the sender device based at least in part on the system parameter published by the central system, calculating a temporary common key of the sender device based at least in part on the temporary secret key of the sender device and a public key of a receiver device, calculating a ciphertext from a message based at least in part on the temporary common key, generating a signature of the sender device from the ciphertext based at least in part on an intermediate parameter, the system parameter and the secret key of the sender device, and transmitting the temporary public key of the sender device, ciphertext and signature to the receiver device. The temporary secret key of the sender device, intermediate parameter and secret key of the sender device are engaged in a non-associative octonion ring.

In yet another example, a computer-readable storage medium may store computer-executable instructions that, in response to execution, cause a receiver device to perform operations including calculating a public key of the receiver device based at least in part on a system parameter published by a central system, transmitting the public key of the receiver device, receiving, from a sender device, a ciphertext and a temporary public key of the sender device, calculating a temporary common key of the receiver device based at least in part on the temporary public key of the sender device, a secret key of the receiver device and the system parameter published by the central system, and obtaining a message by deciphering the ciphertext based at least in part on the temporary common key of the receiver device. The secret key of the receiver device is engaged in a non-associative octonion ring.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
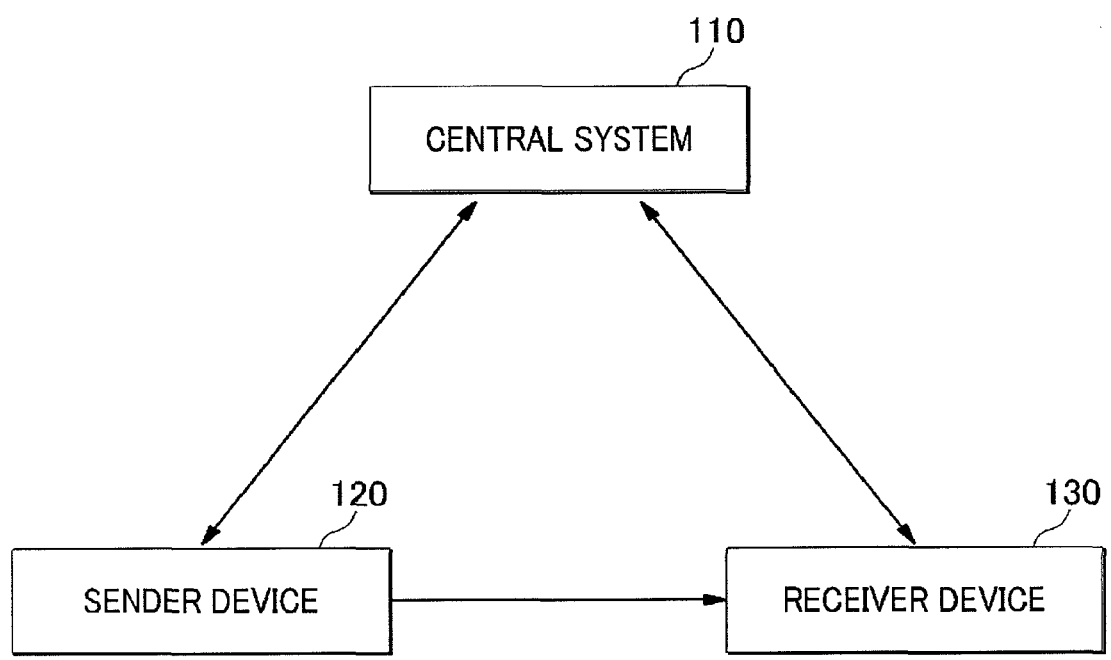
FIG. 1 schematically shows an illustrative example of an environment including a central system, a sender device and a receiver device, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to a signcryption scheme. Technologies are generally described for a method for performing signcryption and designcryption between multiple devices with enhanced security and saved computational complexity.

In some embodiments, a sender device may encrypt a message and make a digital signature on the encrypted message, simultaneously. The sender device may perform signcryption based on a non-associative octonion ring over finite field. Generally in mathematics, the octonion ring over finite field is normed algebra over finite field, usually represented by the capital letter "O." For performing signcryption, a few of public keys, secret keys and parameters are necessary. The public keys, secret keys and parameters are engaged in the non-associative octonion ring over finite field in mathematics. The sender device may download the parameters from a central system and calculate the public keys and secret keys based on the parameters. Then, the sender device may calculate a ciphertext from a message based on the public keys and secret keys. Further, the sender device may generate a digital signature based on the parameters, public keys and secret keys. The sender device may transmit the calculated the public keys of the sender device to the central system. The sender device may transmit the calculated ciphertext and generated digital signature of the sender device to a receiver device.

The receiver device may receive the calculated ciphertext and generated digital signature of the sender device from the sender device. For performing designcryption, a few of public keys and parameters are necessary. The receiver device may download the parameters and public keys of the sender device from the central system. Then, the receiver device may decipher the ciphertext based on the public keys of the sender device and parameters. Further, the receiver device may determine whether the signature is generated by the sender device based on the public keys of the sender device and parameters downloaded from the central system.

FIG. 1 schematically shows an illustrative example of an environment 100 including a central system 110, a sender device 120 and a receiver device 130, arranged in accordance with at least some embodiments described herein. As illustrated in FIG. 1, sender device 120 may download a few of parameters including a system parameter and a hash coefficient from central system 110. The system parameter and the hash coefficient may be engaged in a non-associative octonion ring. Further, sender device 120 may transmit a public key of sender device 120 to central system 110 and sender device 120 may download a public key of receiver device 130 from central system 110. The public key of receiver device 130 may be necessary for sender device 120 to calculate a ciphertext from a message.

Receiver device 130 may download the system parameter and the hash coefficient from central system 110. Further, receiver device 130 may transmit the public key of receiver device 130 to central system 110 and receiver device 130 may download the public key of sender device 120 from central system 110. The public key of sender device 120 may be necessary for receiver device 130 to verify a digital signature of sender device 120.

Sender device 120 may transmit a ciphertext and a digital signature of sender device 120 to receiver device 130. Further, sender device 120 may transmit a temporary public key of sender device 120 to receiver device 130. The temporary public key of sender device 120 may be necessary for receiver device 130 to decipher the ciphertext. Receiver device 130 may decipher the ciphertext and verify the digital signature of sender device 120.

Figure 2:
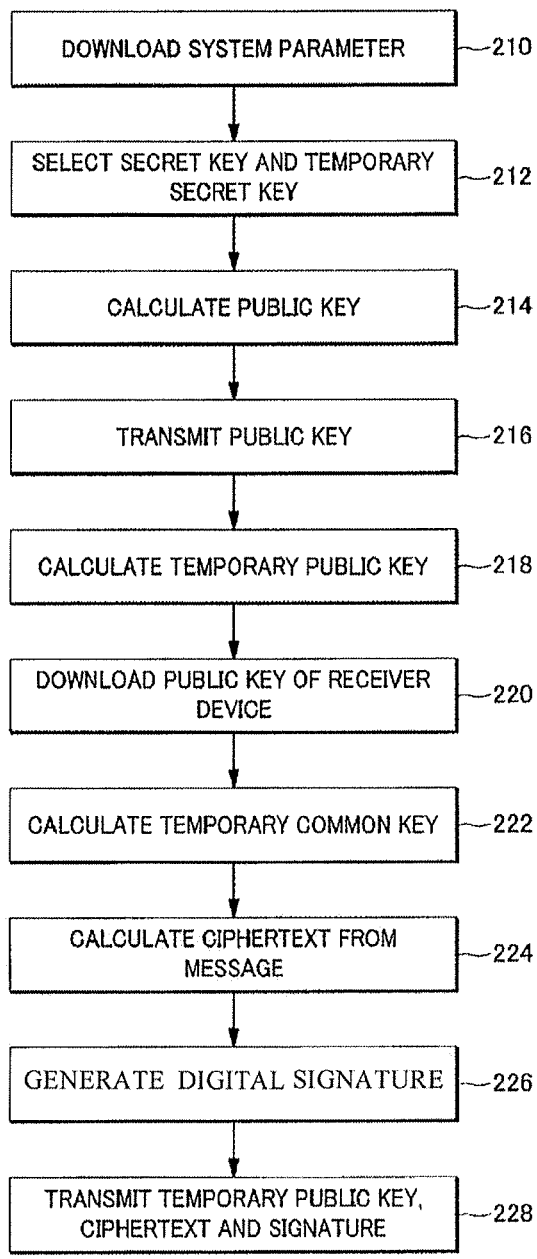
FIG. 2 schematically shows an example flow diagram of a process of a sender device for performing signcryption, arranged in accordance with at least some embodiments described herein.

FIG. 2 schematically shows an example flow diagram of a process of a sender device for performing signcryption, arranged in accordance with at least some embodiments described herein. The process in FIG. 2 may be implemented in environment 100 including central system 110, sender device 120 and receiver device 130, as illustrated in FIG. 1. An example process may include one or more operations, actions, or functions as illustrated by one or more blocks 210, 212, 214, 216, 218, 220, 222, 224, 226, and/or 228. Although illustrated as discrete blocks, various blocks may be divided into additional blocks, combined into fewer blocks, or eliminated, depending on the desired implementation. Processing may begin at block 210.

At block 210 (Download System Parameter), in some embodiments, sender device 120 may download a system parameter from central system 110. Central system 110 may publish the system parameter. The system parameter may be engaged in a non-associative octonion ring O and have a size of O ($2^{16}$). Processing may proceed from block 210 to block 212.

At block 212 (Select Secret Key and Temporary Secret Key), sender device 120 may select a secret key of sender device 120 randomly. Further, at block 212, sender device 120 may select a temporary secret key of sender device 120 randomly. The secret key and the temporary secret key of sender device 120 may be engaged in non-associative octonion ring O. Processing may proceed from block 212 to block 214.

At block 214 (Calculate Public Key), sender device 120 may calculate a public key of sender device 120 based on the system parameter which is downloaded from central system 110 at block 210 and the secret key of sender device 120, which is selected at block 212. Processing may proceed from block 214 to block 216

At block 216 (Transmit Public Key), sender device 120 may transmit the public key of sender device 120 to central system 110. Processing may proceed from block 216 to block 218.

At block 218 (Calculate Temporary Public Key), sender device 120 may calculate a temporary public key of sender device 120 based on the system parameter which is downloaded from central system 110 at block 210 and the temporary secret key of sender device 120, which is selected at block 212. Processing may proceed from block 218 to block 220.

At block 220 (Download Public Key of Receiver Device), sender device 120 may download a public key of receiver device 130 from central system 110. To calculate the public key of receiver device 130, receiver device 130 may select a secret key of receiver device 130 randomly and download the system parameter from central system 110. The secret key of receiver device 130 may be engaged in non-associative octonion ring O. Receiver device 130 may calculate the public key of receiver device 130 based on the secret key of receiver device 130 and the system parameter. Then, receiver device 130 may transmit the public key of receiver device 130 to central system 110 and then, sender device 120 may receive the public key of receiver device 130 from central system 110. Processing may proceed from block 220 to block 222.

At block 222 (Calculate Temporary Common Key), sender device 120 may calculate temporary common keys of sender device 120 based on the temporary secret key of sender device 120, which is selected at block 212 and the public key of receiver device 130, which is downloaded from central system 110 at block 220. Processing may proceed from block 222 to block 224.

At block 224 (Calculate Ciphertext from Message), sender device 120 may calculate a ciphertext from a message based on the temporary common keys of sender device 120, which are calculated at block 222. In some other embodiments, sender device 120 may generate a combined temporary common key of sender device 120 based on the temporary common keys of sender device 120. The combined temporary common key of sender device 120 may include the temporary common keys of sender device 120. Then sender device 120 may calculate the ciphertext from the message based on the combined temporary common key of sender device 120. Processing may proceed from block 224 to block 226.

At block 226 (Generate Digital Signature), sender device 120 may generate a digital signature of sender device 120 from the ciphertext based on the system parameter and the secret key of sender device 120. To generate the digital signature, an intermediate parameter may also be necessary. Sender device 120 may receive a hash coefficient which is published by central system 110 from central system 110 and calculate the intermediate parameter based on the ciphertext and a hash function which is performed based on the hash coefficient. The intermediate parameter may be engaged in non-associative octonion ring O. Processing may proceed from block 226 to block 228.

At block 228 (Transmit Temporary Public Key, Ciphertext and Signature), sender device 120 may transmit the temporary public key of sender device 120, the ciphertext and the digital signature of sender device 120 to receiver device 130.

Figure 3:
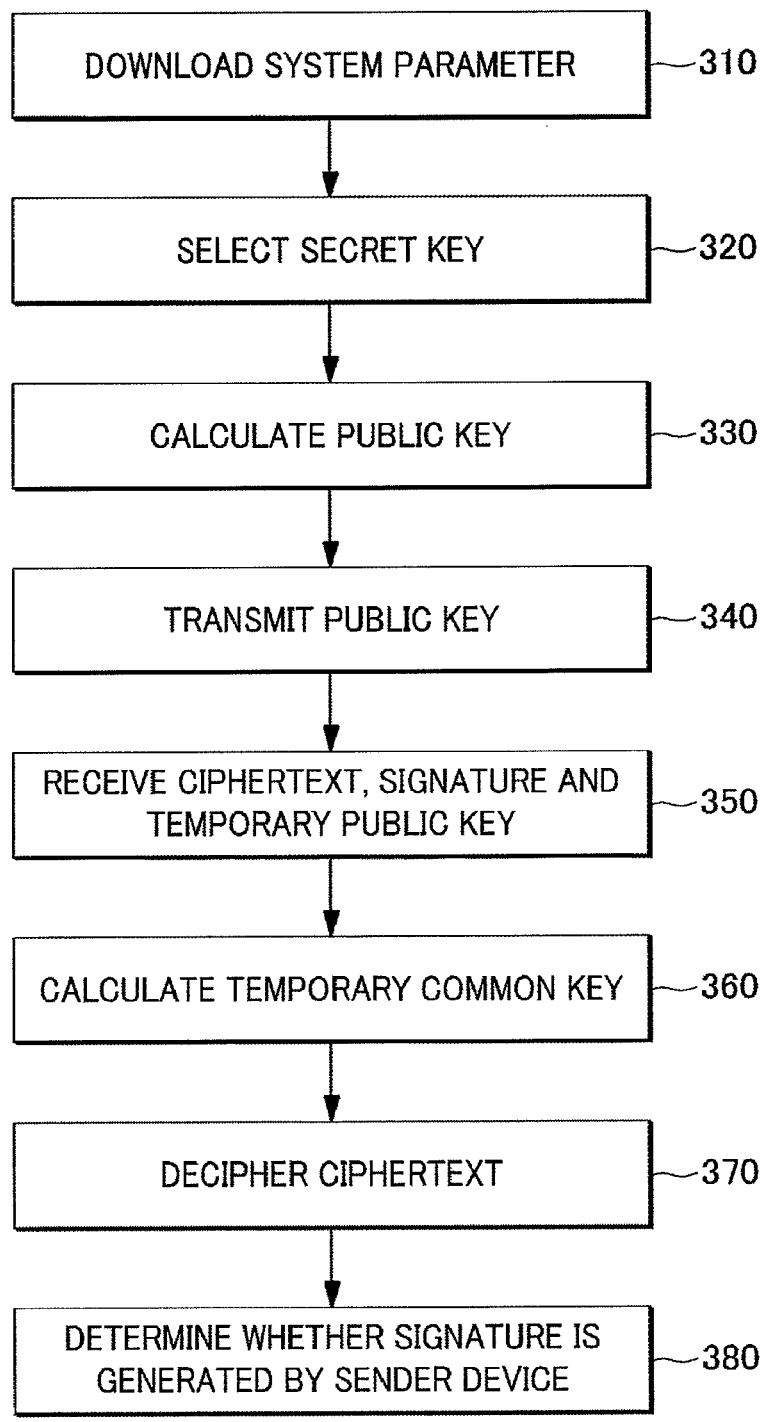
FIG. 3 schematically shows an example flow diagram of a process of a receiver device for performing designcryption, arranged in accordance with at least some embodiments described herein.

FIG. 3 schematically shows an example flow diagram of a process of a receiver device for performing designcryption, arranged in accordance with at least some embodiments described herein. The process in FIG. 3 may be implemented in environment 100 including central system 110, sender device 120 and receiver device 130, as illustrated in FIG. 1. An example process may include one or more operations, actions, or functions as illustrated by one or more blocks 310, 320, 330, 340, 350, 360, 370 and/or 380. Although illustrated as discrete blocks, various blocks may be divided into additional blocks, combined into fewer blocks, or eliminated, depending on the desired implementation. Processing may begin at block 310.

At block 310 (Download System Parameter), in some embodiments, receiver device 130 may download a system parameter from central system 110. Central system 110 may publish the system parameter. The system parameter may be engaged in a non-associative octonion ring O and have a size of O ($2^{16}$). Processing may proceed from block 310 to block 320.

At block 320 (Select Secret Key), receiver device 130 may select a secret key of receiver device 130 randomly. The secret key of receiver device 130 may be engaged in non-associative octonion ring O. Processing may proceed from block 320 to block 330.

At block 330 (Calculate Public Key), receiver device 130 may calculate a public key of receiver device 130 based on the system parameter which is downloaded from central system 110 at block 310 and the secret key of receiver device 130, which is selected at block 320. Processing may proceed from block 330 to block 340.

At block 340 (Transmit Public Key), receiver device 130 may transmit the public key of receiver device 130 to central system 110. Processing may proceed from block 340 to block 350.

At block 350 (Receive Temporary Public Key, Ciphertext and Signature), receiver device 130 may receive a temporary public key of sender device 120, a ciphertext and a digital signature of sender device 120 from sender device 120. The temporary public key of sender device 120 may be calculated by sender device 120 at block 218 in FIG. 2. The ciphertext may be calculated by sender device 120 at block 224 in FIG. 2. The digital signature of sender device 120 may be generated by sender device 120 at block 226 in FIG. 2. Processing may proceed from block 350 to block 360.

At block 360 (Calculate Temporary Common Key), receiver device 130 may calculate temporary common keys of receiver device 130 based on the temporary public key of sender device 120, which is received from sender device 120 at block 350 and the system parameter which is downloaded from central system 110 at block 310. Further, to calculate the temporary common keys of receiver device 130, a secret key of receiver device 130 may also be necessary. Receiver device 130 may select the secret key of receiver device 130 randomly. The secret key of receiver device 130 may be engaged in non-associative octonion ring O. Processing may proceed from block 360 to block 370.

At block 370 (Decipher Ciphertext), receiver device 130 may decipher the ciphertext based on the temporary common keys of receiver device 130, which is calculated at block 360. In some other embodiments, receiver device 130 may generate a combined temporary common key of receiver device 130 based on the temporary common keys of receiver device 130, which are calculated at block 360. The combined temporary common key of receiver device 130 may include the temporary common keys of receiver device 130. Then receiver device 130 may decipher the ciphertext based on the combined temporary common key of receiver device 130. Accordingly, receiver device 130 may obtain a message that sender device 120 want to send to receiver device 130. Processing may proceed from block 370 to block 380.

At block 380 (Verify), receiver device 130 may determine whether the digital signature received at block 350 is generated by sender device 120. For determining, receiver device 130 may download a public key of sender device 120 from central system 110. To calculate the public key of sender device 120, sender device 120 may select a secret key of sender device 120 randomly and download the system parameter from central system 110. The secret key of sender device 120 may be engaged in non-associative octonion ring O. Sender device 120 may calculate the public key of sender device 120 based on the secret key of sender device 120 and the system parameter. Then, sender device 120 may transmit the public key of sender device 120 to central system 110 and then receiver device 120 may receive the public key of sender device 120 from central system 110.

For determining at block 380, an intermediate parameter may also be necessary. Receiver device 130 may receive a hash coefficient which is published by central system 110 from central system 110 and calculate the intermediate parameter based on the ciphertext and a hash function which is performed based on the hash coefficient. The intermediate parameter may be engaged in non-associative octonion ring O. Accordingly, receiver device 130 may determine whether the digital signature received from sender device 120 at block 350 is generated by sender device 120 based on the public key of sender device 120 and the intermediate parameter.

Figure 4:
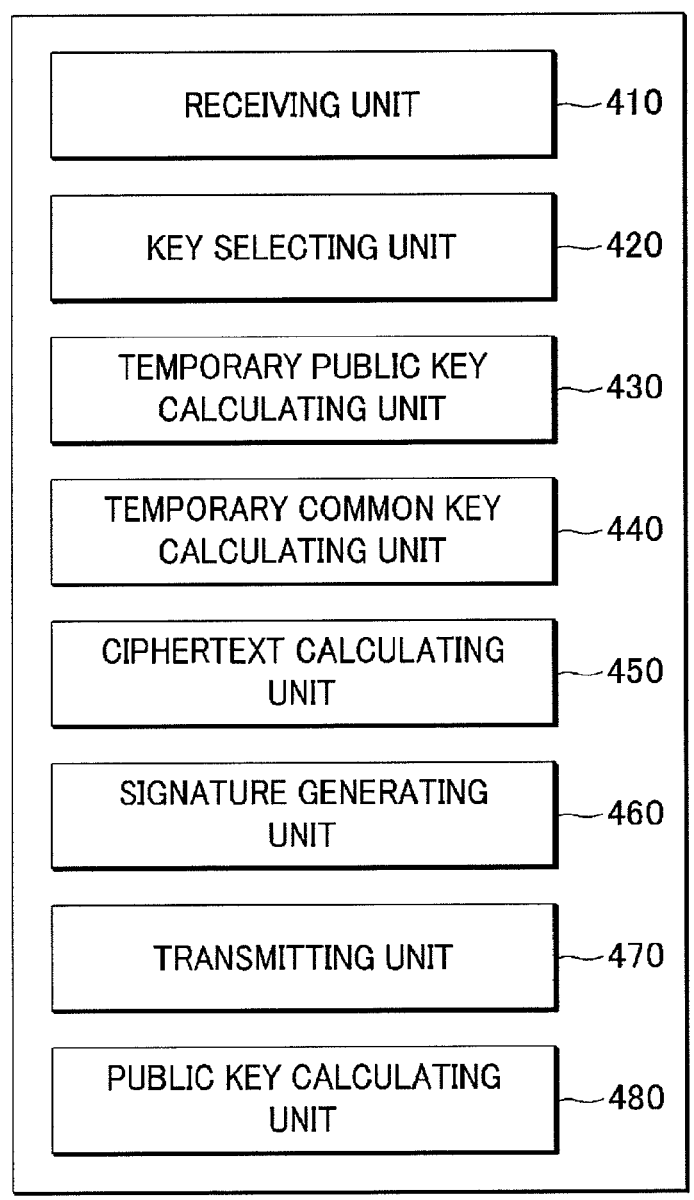
FIG. 4 shows a schematic block diagram illustrating an example architecture for a sender device, arranged in accordance with at least some embodiments described herein.

FIG. 4 shows a schematic block diagram illustrating an example architecture for a sender device, arranged in accordance with at least some embodiments described herein. As depicted in FIG. 4, sender device 120 may include a receiving unit 410, a key selecting unit 420, a temporary public key calculating unit 430, a temporary common key calculating unit 440, a ciphertext calculating unit 450, a signature generating unit 460, a transmitting unit 470 and a public key calculating unit 480. Although illustrated as discrete components, various components may be divided into additional components, combined into fewer components, or eliminated altogether while being contemplated within the scope of the disclosed subject matter.

Receiving unit 410 may be configured to receive a system parameter and a hash coefficient from central system 110. The system parameter may be engaged in non-associative octonion ring O and have a size of O ($2^{16}$). Further, receiving unit 410 may be configured to receive a public key of receiver device 130 from central system 110.

Key selecting unit 420 may be configured to select a secret key of sender device 120 and a temporary secret key of sender device 120 randomly. The secret key and temporary secret key of sender device 120 may be engaged in non-associative octonion ring O.

Temporary public key calculating unit 430 may be configured to calculate a temporary public key of sender device 120 based on the system parameter received by receiving unit 410 and the temporary secret key of sender device 120, which is selected by key selecting unit 420.

Temporary common key calculating unit 440 may be configured to calculate temporary common keys of sender device 120 based on the temporary secret key of sender device 120, which is selected by key selecting unit 420 and the public key of receiver device 130, which is received by receiving unit 410.

In some embodiments, temporary common key calculating unit 440 may be configured to generate a combined temporary common key of sender device 120 based on the temporary common keys of sender device 120. The combined temporary common key of sender device 120 may include the temporary common keys of sender device 120.

Ciphertext calculating unit 450 may be configured to calculate a ciphertext from a message based on the temporary common keys of sender device 120, which is calculated by temporary common key calculating unit 440. In some embodiments, ciphertext calculating unit 450 may calculate the ciphertext from the message based on the combined temporary common key of sender device 120, which is calculated by temporary common key calculating unit 440.

Signature generating unit 460 may be configured to generate a digital signature of sender device 120 from the ciphertext based on the system parameter received by receiving unit 410 and the secret key of sender device 120, which is selected by key selecting unit 420. To generate the digital signature, an intermediate parameter may also be necessary. Signature generating unit 460 may calculate the intermediate parameter based on the ciphertext and a hash function which is performed based on the hash coefficient received by receiving unit 410 from central system 110. The intermediate parameter may be engaged in non-associative octonion ring O.

Transmitting unit 470 may be configured to transmit the temporary public key of sender device 120, the ciphertext and the digital signature of sender device 120 to receiver device 130.

Public key calculating unit 480 may be configured to calculate the public key of sender device 120 based on the secret key of sender device 120, which is selected by key selecting unit 420 and the system parameter which is received by receiving unit 410 from central system 110. Then, transmitting unit 470 may transmit the public key of sender device 120 to central system 110.

Figure 5:
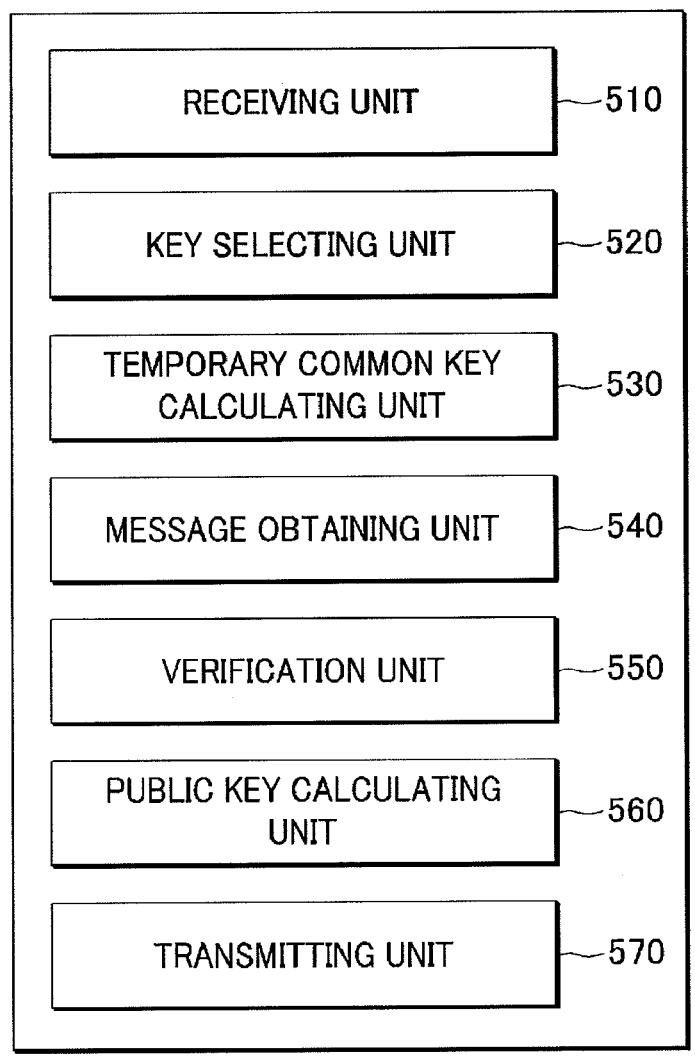
FIG. 5 shows a schematic block diagram illustrating an example architecture for a receiver device, arranged in accordance with at least some embodiments described herein.

FIG. 5 shows a schematic block diagram illustrating an example architecture for a receiver device, arranged in accordance with at least some embodiments described herein. As depicted in FIG. 5, receiver device 130 may include a receiving unit 510, a key selecting unit 520, a temporary common key calculating unit 530, a message obtaining unit 540, a verification unit 550, a public key calculating unit 560 and a transmitting unit 570. Although illustrated as discrete components, various components may be divided into additional components, combined into fewer components, or eliminated altogether while being contemplated within the scope of the disclosed subject matter.

Receiving unit 510 may be configured to receive a temporary public key of sender device 120, a ciphertext and a digital signature of sender device 120 from sender device 120. Further, receiving unit 510 may be configured to receive a system parameter and a hash coefficient from central system 110. The system parameter may be engaged in non-associative octonion ring O and have a size of O ($2^{16}$). Further, receiving unit 510 may be configured to receive a public key of sender device 120 from central system 110.

Key selecting unit 520 may be configured to select a secret key of receiver device 130 randomly. The secret key of receiver device 130 may be engaged in non-associative octonion ring O.

Temporary common key calculating unit 530 may be configured to calculate temporary common keys of receiver device 130 based on the temporary public key of sender device 120 and the system parameter, which are received by receiving unit 510, and the secret key of receiver device 130, which is selected by key selecting unit 520. In some other embodiments, temporary common key calculating unit 530 may be configured to generate a combined temporary common key of receiver device 130 based on the temporary common keys of receiver device 130. The combined temporary common key of receiver device 130 may include the temporary common keys of receiver device 130.

Message obtaining unit 540 may be configured to obtain the message by deciphering the ciphertext based on the temporary common keys of receiver device 130 which is calculated by temporary common key calculating unit 530. In some other embodiments, message obtaining unit 540 may decipher the ciphertext based on the combined temporary common key of receiver device 130, which is generated by temporary common key calculating unit 530.

Verification unit 550 may be configured to determine whether the digital signature received by receiving unit 510 from sender device 120 is generated by sender device 120 based on the public key of sender device 120, which is received by receiving unit 510 and an intermediate parameter. Verification unit 550 may calculate the intermediate parameter based on the ciphertext and a hash function which is performed based on the hash coefficient received by receiving unit 510 from central system 110. The intermediate parameter may be engaged in non-associative octonion ring O.

Public key calculating unit 560 may be configured to calculate a public key of receiver device 130 based on the secret key of receiver device 130, which is selected by key selecting unit 520 and the system parameter which is received by receiving unit from central system 110.

Transmitting unit 570 may transmit the public key of receiver device 130 to central system 110 and then sender device 120 may receive the public key of receiver device 130 from central system 110.

Figure 6:
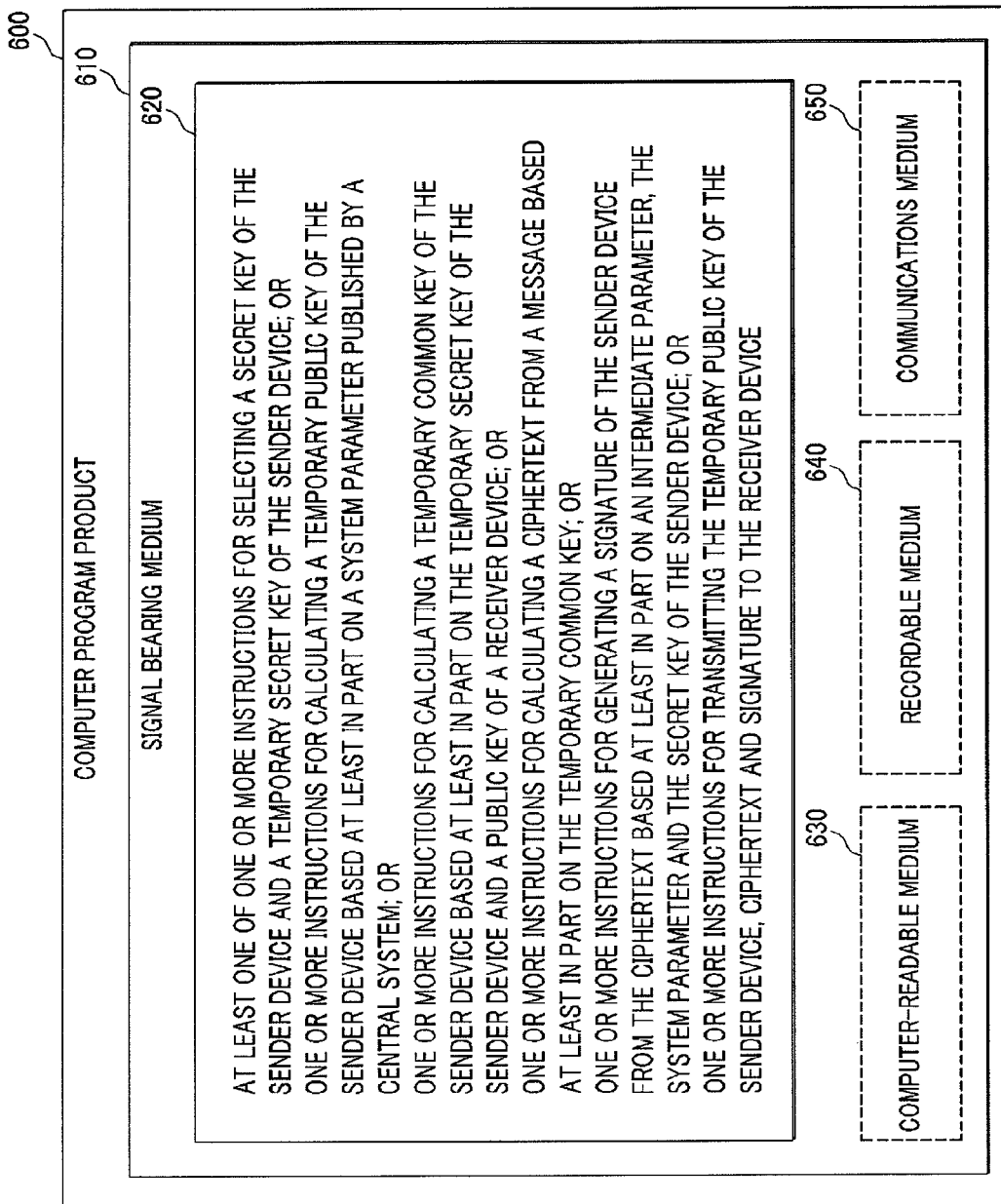
FIG. 6 illustrates computer program products that may be utilized to provide a signcryption scheme, arranged in accordance with at least some embodiments described herein.

FIG. 6 illustrates computer program products that may be utilized to provide a signcryption scheme, arranged in accordance with at least some embodiments described herein. Program product 600 may include a signal bearing medium 610. Signal bearing medium 610 may include one or more instructions 620 that, when executed by, for example, a processor, may provide the functionality described above with respect to FIGS. 1-5. By way of example, instructions 620 may include: one or more instructions for selecting a secret key of the sender device and a temporary secret key of the sender device; one or more instructions for calculating a temporary public key of the sender device based at least in part on a system parameter published by a central system; one or more instructions for calculating a temporary common key of the sender device based at least in part on the temporary secret key of the sender device and a public key of a receiver device; one or more instructions for calculating a ciphertext from a message based at least in part on the temporary common key; one or more instructions for generating a signature of the sender device from the ciphertext based at least in part on an intermediate parameter, the system parameter and the secret key of the sender device; and one or more instructions for transmitting the temporary public key of the sender device, ciphertext and signature to the receiver device. Thus, for example, referring to FIG. 2, sender device 120 may undertake one or more of the blocks shown in FIG. 2 in response to instructions 620.

By way of example, instructions 620 may include: one or more instructions for receiving, from a sender device, a ciphertext and a temporary public key of the sender device; one or more instructions for calculating a temporary common key of the receiver device based at least in part on the temporary public key of the sender device, a secret key of the receiver device and a system parameter published by a central system; and one or more instructions for obtaining a message by deciphering the ciphertext based at least in part on the temporary common key of the receiver device. Thus, for example, referring to FIG. 3, receiver device 130 may undertake one or more of the blocks shown in FIG. 3 in response to instructions 620.

In some implementations, signal bearing medium 610 may encompass a computer-readable medium 630, such as, but not limited to, a hard disk drive, a CD, a DVD, a digital tape, memory, etc. In some implementations, signal bearing medium 610 may encompass a recordable medium 640, such as, but not limited to, memory, read/write (R/W) CDs, R/W DVDs, etc. In some implementations, signal bearing medium 610 may encompass a communications medium 650, such as, but not limited to, a digital and/or an analog communication medium (e.g., a fiber optic cable, a waveguide, a wired communications link, a wireless communication link, etc.). Thus, for example, program product 600 may be conveyed to one or more modules of sender device 120 by an RF signal bearing medium 620, where the signal bearing medium 620 is conveyed by a wireless communications medium 650 (e.g., a wireless communications medium conforming with the IEEE 802.11 standard).

Figure 7:
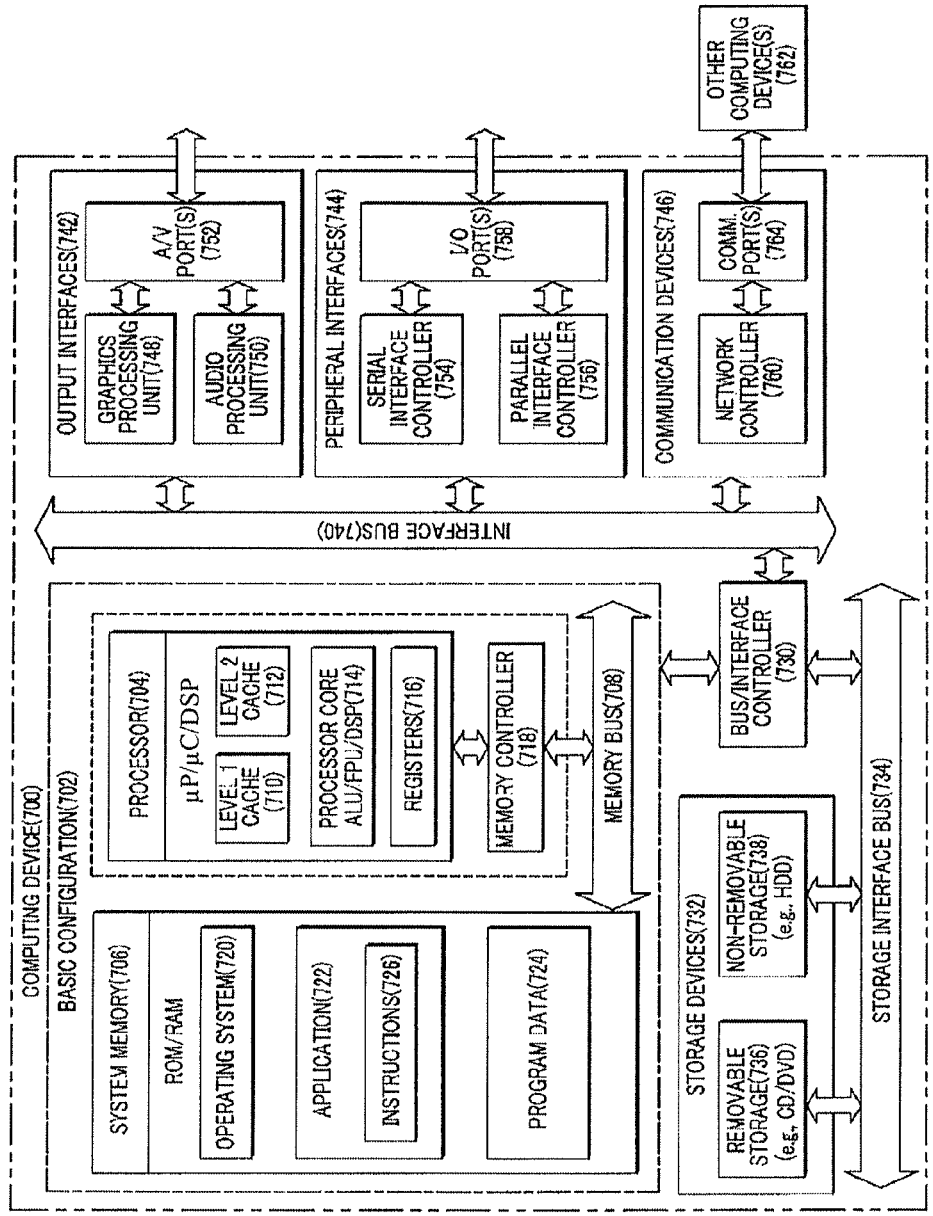
FIG. 7 is a block diagram illustrating an example computing device that may be utilized to provide a signcryption scheme, arranged in accordance with at least some embodiments described herein.

FIG. 7 is a block diagram illustrating an example computing device that may be utilized to provide a signcryption scheme, arranged in accordance with at least some embodiments described herein. In these examples, elements of computing device 700 may be arranged or configured for a device. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a sender device, comprising:
   selecting a secret key of the sender device and a temporary secret key of the sender device;
   calculating a public key of the sender device based at least in part on a system parameter published by a central system and the secret key of the sender device;
   transmitting the public key of the sender device to the central system;
   calculating a temporary public key of the sender device based at least in part on the system parameter published by the central system and the temporary secret key of the sender device;
   calculating a temporary common key of the sender device based at least in part on the temporary secret key of the sender device and a public key of a receiver device;
   calculating a ciphertext from a message based at least in part on the temporary common key;
   generating a signature of the sender device from the ciphertext based at least in part on an intermediate parameter, the system parameter, and the secret key of the sender device, wherein the intermediate parameter is calculated based at least in part on the ciphertext and a hash coefficient published by the central system; and
   transmitting the temporary public key of the sender device, ciphertext and signature to the receiver device,
   wherein the temporary secret key of the sender device, intermediate parameter and secret key of the sender device are engaged in a non-associative octonion ring.

2. The method of claim 1, further comprising:
   downloading the system parameter from the central system.

3. The method of claim 1, further comprising:
   downloading the public key of the receiver device from the central system.

4. The method of claim 1, further comprising:
   generating a combined temporary common key of the sender device based at least in part on the temporary common key of the sender device, and
   wherein the ciphertext is calculated based at least in part on the combined temporary common key.

5. A method performed under control of a receiver device, comprising:
   receiving, from a sender device, a ciphertext and a temporary public key of the sender device;
   selecting a secret key of the receiver device;
   calculating a public key of the receiver device based at least in part on a system parameter published by a central system and the secret key of the receiver device;
   transmitting the public key of the receiver device to the central system;
   calculating a temporary common key of the receiver device based at least in part on the temporary public key of the sender device, the secret key of the receiver device and the system parameter published by the central system;
   obtaining a message by deciphering the ciphertext based at least in part on the temporary common key of the receiver device,
   wherein the secret key of the receiver device is engaged in a non-associative octonion ring;
   receiving, from the sender device, a signature of the sender device;
   downloading a public key of the sender device from the central system; and
   determining, based at least in part on the public key of the sender device and an intermediate parameter, whether the signature is generated by the sender device,
   wherein the intermediate parameter is calculated based at least in part on the ciphertext and a hash coefficient published by the central system, and
   wherein the intermediate parameter is engaged in the non-associative octonion ring.

6. The method of claim 5, further comprising:
   downloading the system parameter from the central system.

7. The method of claim 5, further comprising:
   generating a combined temporary common key of the receiver device based at least in part on the temporary common key of the receiver device, and
   wherein the deciphering of the ciphertext is based at least in part on the combined temporary common key of the receiver device.

8. A processor-enabled sender computing device, comprising:
   a key selecting unit configured to select a secret key of the sender device and a temporary secret key of the sender device;
   a temporary public key calculating unit configured to calculate a temporary public key of the sender device based at least in part on a system parameter published by a central system;

a temporary common key calculating unit configured to calculate a temporary common key of the sender device based at least in part on the temporary secret key of the sender device and a public key of a receiver device;

a ciphertext calculating unit configured to calculate a ciphertext from a message based at least in part on the temporary common key;

a signature generating unit configured to generate a signature of the sender device from the ciphertext based at least in part on the system parameter, an intermediate parameter, and the secret key of the sender device, wherein the intermediate parameter is calculated based at least in part on the ciphertext and a hash coefficient published by the central system; and a transmitting unit configured to transmit the temporary public key of the sender device, ciphertext and signature to the receiver device, wherein the temporary secret key of the sender device, intermediate parameter and secret key of the sender device are engaged in a non-associative octonion ring.

9. The sender computing device of claim 8, further comprising:

a receiving unit configured to receive the system parameter from the central system.

10. The sender computing device of claim 9, wherein the receiving unit further configured to receive the public key of the receiver device from the central system.

11. The sender computing device of claim 8, wherein the temporary common key calculating unit further configured to generate a combined temporary common key of the sender device based at least in part on the temporary common key of the sender device, and the ciphertext calculating unit calculates the ciphertext based at least in part on the combined temporary common key.

12. The sender computing device of claim 8, further comprising:

a public key calculating unit configured to calculate a public key of the sender device based at least in part on the system parameter and the secret key of the sender device, and wherein the transmitting unit further configured to transmit the public key of the sender device to the central system.

13. A processor-enabled receiver computing device, comprising:

a receiving unit configured to receive, from a sender device, a ciphertext and a temporary public key of the sender device;

a temporary common key calculating unit configured to calculate a temporary common key of the receiver device based at least in part on the temporary public key of the sender device, a secret key of the receiver device and a system parameter published by a central system;

a message obtaining unit configured to obtain a message by deciphering the ciphertext based at least in part on the temporary common key of the receiver device, wherein the secret key of the receiver device is engaged in a non-associative octonion ring, wherein the receiving unit further configured to:

receive, from the sender device, a signature of the sender device, and receive a public key of the sender device from the central system; and a verification unit configured to determine, based at least in part on the public key of the sender device and an intermediate parameter which is engaged in the non-associative octonion ring, whether the signature is generated by the sender device, wherein the intermediate parameter is calculated based at least in part on the ciphertext and a hash coefficient published by the central system.

14. The receiver computing device of claim 13, wherein the receiving unit further configured to receive the system parameter from the central system.

15. The receiver computing device of claim 13, wherein the temporary common key calculating unit further configured to generate a combined temporary common key of the receiver device based at least in part on the temporary common key of the receiver device, and the message obtaining unit deciphers the ciphertext based at least in part on the combined temporary common key of the receiver device.

16. The receiver computing device of claim 13, further comprising:

a key selecting unit configured to select the secret key of the receiver device;

a public key calculating unit configured to calculate a public key of the receiver device based at least in part on the system parameter and the secret key of the receiver device; and a transmitting unit configured to transmit the public key of the receiver device to the central system.

17. A non-transitory computer-readable storage medium having stored thereon computer-executable instructions that, in response to execution, cause a sender device to perform operations, comprising:

selecting a secret key of the sender device and a temporary secret key of the sender device;

calculating a temporary public key of the sender device based at least in part on a system parameter published by a central system;

calculating a temporary common key of the sender device based at least in part on the temporary secret key of the sender device and a public key of a receiver device;

calculating a ciphertext from a message based at least in part on the temporary common key;

generating a signature of the sender device from the ciphertext based at least in part on an intermediate parameter, the system parameter and the secret key of the sender device, wherein the intermediate parameter is calculated based at least in part on the ciphertext and a hash coefficient published by the central system; and transmitting the temporary public key of the sender device, ciphertext and signature to the receiver device, and wherein the temporary secret key of the sender device, intermediate parameter and secret key of the sender device are engaged in a non-associative octonion ring.

18. A non-transitory computer-readable storage medium having stored thereon computer-executable instructions that, in response to execution, cause a receiver device to perform operations, comprising:

receiving, from a sender device, a ciphertext and a temporary public key of the sender device;

calculating a temporary common key of the receiver device based at least in part on the temporary public key of the sender device, a secret key of the receiver device and a system parameter published by a central system;

obtaining a message by deciphering the ciphertext based at least in part on the temporary common key of the receiver device, wherein the secret key of the receiver device is engaged in a non-associative octonion ring;

receiving, from the sender device, a signature of the sender device;

downloading a public key of the sender device from the central system; and determining, based at least in part on the public key of the sender device and an intermediate parameter, whether the signature is generated by the sender device, wherein the intermediate parameter is calculated based at least in part on the ciphertext and a hash coefficient published by the central system, and wherein the intermediate parameter is engaged in the non-associative octonion ring.

* * * * *